US006629083B1

United States Patent
Morton

(10) Patent No.: US 6,629,083 B1
(45) Date of Patent: Sep. 30, 2003

(54) COMPUTER-BASED SERVICE COOPERATIVE SYSTEM AND METHOD FOR USING THE SAME

(76) Inventor: Andrew B. Morton, 684 Thelma Dr., Wadsworth, OH (US) 44281

(*) Notice: Subject to any disclaimer, the term of this patent is extended or adjusted under 35 U.S.C. 154(b) by 203 days.

(21) Appl. No.: 09/611,538

(22) Filed: Jul. 7, 2000

(51) Int. Cl.[7] .............................................. G06F 17/60
(52) U.S. Cl. ......................................... 705/37; 705/30
(58) Field of Search ............................ 705/37, 29, 40, 705/30

(56) References Cited

U.S. PATENT DOCUMENTS

| | | | | |
|---|---|---|---|---|
| 5,592,376 A | * | 1/1997 | Hodroff ........................ 705/34 |
| 6,119,106 A | * | 9/2000 | Mersky et al. ................. 705/40 |
| 6,343,738 B1 | * | 2/2002 | Ogilvie ......................... 235/381 |
| 6,360,209 B1 | * | 3/2002 | Loeb et al. .................... 705/34 |
| 2002/0004759 A1 | * | 1/2002 | Bradford et al. .............. 705/26 |
| 2002/0023034 A1 | * | 2/2002 | Brown et al. .................. 705/36 |
| 2002/0032643 A1 | * | 3/2002 | Himmelstein ................. 705/37 |
| 2002/0038278 A1 | * | 3/2002 | Himmelstein ................. 705/37 |

FOREIGN PATENT DOCUMENTS

JP        4-348496        *   2/1994

OTHER PUBLICATIONS

Morton, Annie, "Starting a baby–sitting Co–Op", Parents' Magazine, v65 p64(4), Jun. 1990.*
BabySitter Exachage Website, p. 1, retreived from the Internet at www.babysitterexhange.com, Dec. 2001.*
www.sandiegomother.com "San Diego Mother.Com Babysitting Co–Ops," date of publication at least as early as Mar. 28, 2000.

* cited by examiner

Primary Examiner—Robert P. Olszewski
Assistant Examiner—Andrew J. Fischer
(74) Attorney, Agent, or Firm—Renner, Kenner, Greive, Bobak, Taylor & Weber

(57) ABSTRACT

A computer-based service cooperative system and method for use includes a host computer or a member initiator computer and at least two member computers linkable to the host or initiator computer. The members are associated in a member group and determine rules and a point value system. In use, one of the members in the member group requests a service event via the host or initiator computer, the host distributes the service event request to other members of the group according to a criteria and one of them accepts and performs the service. A ledger is carried by the host or initiator computer for maintaining a point account for each member. The host or initiator computer calculates a point amount for each service event and adjusts accordingly the point accounts for the provider and the requester. Such a service cooperative system may be used to exchange babysitting or child care services, household chores, yard work, reusable goods, and the like.

10 Claims, 4 Drawing Sheets

SERVICE REQUEST FORM     90

REQUESTOR: _____

SERVICE DATE: _____

TIME

START: _____

FINISH: _____

HOURS: _____ (1/2 HOUR INCREMENTS)

CHILD CARE

OF KIDS: _____ [1-x]

MEALS: _____ [0,1,2,3]

LOCATION: _____ [REQUESTOR, PROVIDER, EITHER]

ESTIMATED POINTS: _____

FIG-4

COMPUTER-BASED SERVICE COOPERATIVE SYSTEM AND METHOD FOR USING THE SAME

TECHNICAL FIELD

The present invention resides generally in the art of systems and methods for facilitating the transfer of services between members of a group. In particular, the present invention is related to systems and methods for tracking points associated with the exchange of services or goods within a group, wherein those members of the group with the largest point deficits are automatically contacted first to determine whether they are available to provide the requested services or goods to a requesting member of the group.

BACKGROUND ART

Barter systems developed into one of the first forms of economic commerce. For example, a farmer could trade or exchange goods, such as chickens or eggs, for other goods such as seeds, supplies, or tools. With the advent of currency, the need for bartering diminished as the farmer could purchase the needed goods for cash raised from the sale of crops.

Barter systems are now coordinated and maintained on the internet. Companies will post their goods available for trade on a barter web site. When another entity wants those goods, the parties settle on a barter price. Each party has an account that is then debited and credited accordingly. This is fairly efficient for the exchange of disparate goods, but not for the exchange of similar goods or services.

Although not widely used, the exchange of similar services between members of a group still occurs. For example, babysitting service cooperatives are well established. These cooperatives typically consist of a number of families with young children in an area who decide to provide babysitting for each other without the exchange of money. The members agree to share responsibilities for record keeping and coordinating the services.

Briefly, the cooperative group appoints a secretary or an administrator that tracks each sit or service rendered. Each member has an account and points or credits are added and deducted according to who provides the service and who requests the service. Points may be determined on any number of scales, such as two points per child, per hour; one point per child, per meal; one point per child, per hour of overnight care within specified hours, and so on. Of course, other point arrangements can be established according to the needs of the group. It is common for the secretarial duties to be rotated among the group members on a monthly basis.

Although these cooperatives are quite popular and effective in their stated purpose, utilization of a cooperative is sometimes problematic. In particular, the secretary for the month may not always have the time to call other members of the cooperative to arrange for another member's requested service. Accordingly, the requested service sometimes goes unfilled which is frustrating for the person requesting the service. Additionally, the tracking of points for services rendered is often times confusing, especially if the agreed upon point totals are not communicated to the secretary in a timely manner. This makes it difficult to balance the point accounts for each member and may even cause bad feelings between the members.

Based upon the foregoing, there is a need to efficiently arrange for an exchange of services between members of a group while reducing the aggravation and anxiety caused thereby. Moreover, if no one can be scheduled to provide the requested services, there is a need for this to be determined in a quick and reliable manner to allow for the service requestor to make other arrangements.

DISCLOSURE OF INVENTION

In light of the foregoing, it is a first object of the present invention to provide a computer-based service cooperative system and method for using the same.

It is another object of the present invention to provide a computer-based service cooperative and method for use, as set forth above, that facilitates the formation of a group based upon a desire of group members to exchange services and/or goods with one another.

It is a further object of the present invention to provide a computer-based service cooperative and method for use, as set forth above, wherein the group may establish point values and ground rules for the administration of the exchange of services and/or goods.

It is yet another object of the present invention to provide a computer-based service cooperative system and method for use, as set forth above, wherein the group may establish a computer network among themselves which may include a host-server such that software loaded into one of the computers or the host functions as a group administrator.

It is yet another object of the present invention to provide a computer-based service cooperative system and method for use, as set forth above, wherein an initiator member of the group may submit the names, rules, and other various types of information needed for establishment of the group.

It is still another object of the present invention to provide a computer-based service cooperative system and method for use, as set forth above, wherein the computer-based group administrator may maintain a point system, a ledger, logs, and other various forms utilized by members of the group.

It is still a further object of the present invention to provide a computer-based service cooperative system and method for use, as set forth above, wherein one of the members may request a service utilizing a form provided by the computer-based group administrator, wherein the requestor provides a date of the service request, an estimated number of points to be earned by performing the service, and wherein the requester submits this information to the computer-based group administrator.

It is an additional object of the present invention to provide a computer-based service cooperative system and method for use, as set forth above, wherein the computer-based group administrator may receive the request and using criteria established by the group and/or predetermined by the computer-based group administrator, distributes the request to other members of the group in a predetermined manner.

It is still yet another object of the present invention to provide a computer-based service cooperative and method for use, as set forth above, which allows the potential service providers to examine the service request and either accept, reject, or ignore the request.

Yet an additional object of the present invention is to provide a computer-based system for a service cooperative system and method for use, as set forth above, wherein once the service request is accepted by a provider, the computer-based group administrator may send reminders to both parties a predetermined period of time before the actual service event is to take place.

It is still an additional object of the present invention to provide a computer-based service cooperative system and method for use, as set forth above, wherein once the service is performed and the service point totals are confirmed, the computer-based group administrator adjusts the ledger and may update each service provider and requestor with their current point total and where they rank in regard to other members of the group.

It is still yet another object of the present invention to provide a computer-based service cooperative system and method for use, as set forth above, wherein the computer-based group administrator may perform ancillary maintenance functions for the group so as to ensure the efficient running of the service cooperative system.

The foregoing and other objects of the present invention, which shall become apparent as the detailed description proceeds, are achieved by computer-based service cooperative system, including a host computer, at least two member computers linkable to the host computer, the member computers associated in a member group, a point value system carried by the host computer, wherein one of the members in the member group requests a service event via the host computer, the host distributing the service event request to other members of the group, one of whom accepts and performs the service, and a ledger carried by the host computer for maintaining a point account for each member, the host computer calculating a point amount for each service event and adjusting accordingly the point accounts for the provider and the requestor.

Other aspects of the present invention are attained by a method for exchanging services between members utilizing a computer network, including the steps of establishing a group of members, each member having access to a computer, determining a point value system for exchanging services between members, the point value system maintained on one of the member's computer, requesting a service by one of the members via the computer from at least one of the other members, accepting via the computer and performing the service request by one of the other members, and automatically adjusting a point account maintained on one of the member's computers for the member performing the service and the member requesting the service according to the point value system upon completion of the service These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 4 is a sample form carried by the computer-based group administrator for use in the service cooperative system according to the present invention.

BEST MODE FOR CARRYING OUT THE INVENTION

Figure 1:
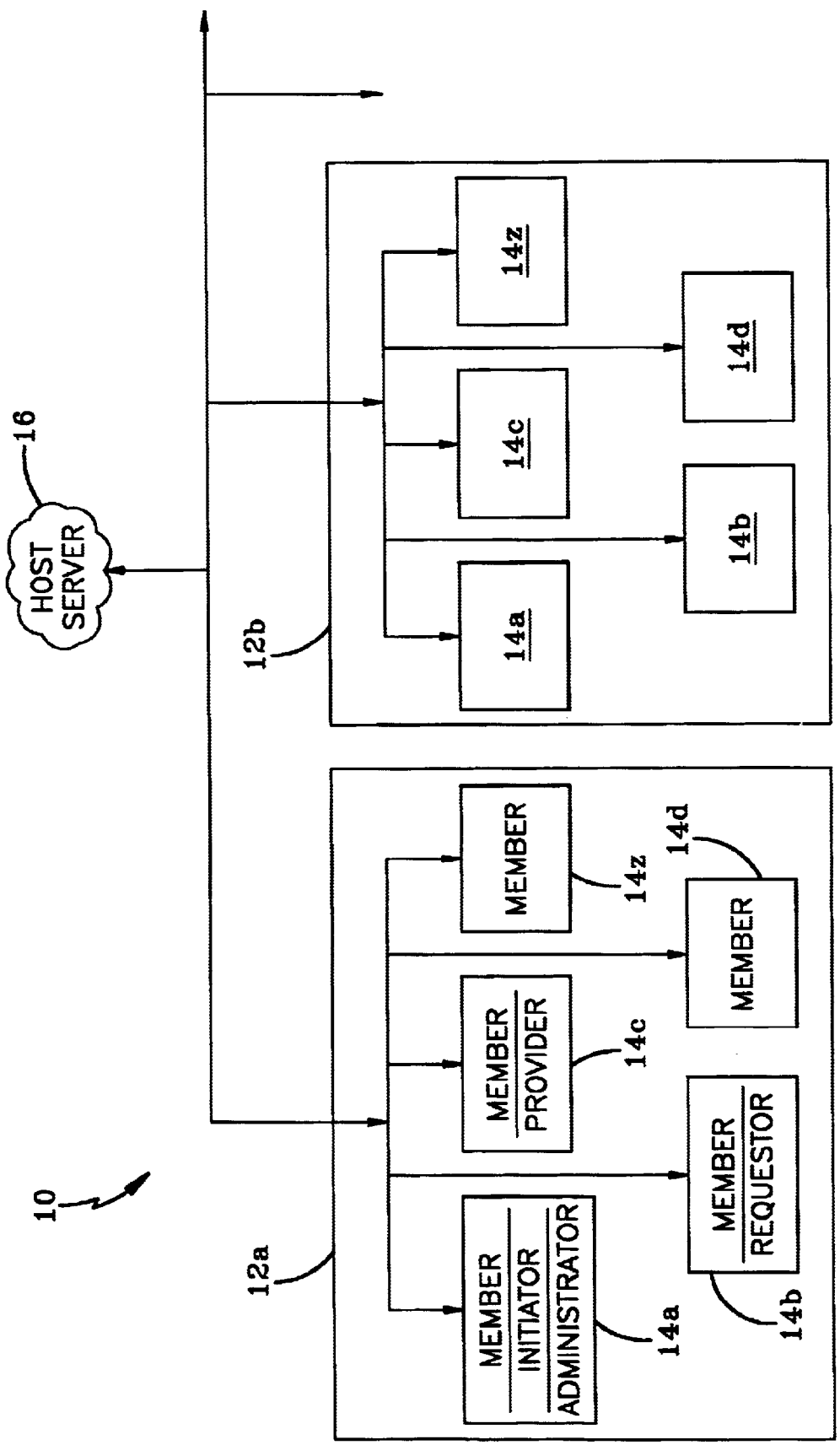
FIG. 1 is a schematic diagram of an exemplary network employed according to the present invention.

Referring now to the drawings and, in particular to FIG. 1, it can be seen that a computer-based service cooperative system is designated generally by the numeral 10. The system 10 includes at least a single group designated generally by the numeral 12, wherein alphabetic suffixes are employed to show that additional groups may be serviced by the system 10. Each group 12 has at least two members 14, wherein each member has an alphabetic suffix designation so as to distinguish between members in the group 12. For example, member 14a may be identified as the initiator/administrator of the group 12. Member 14b may be designated as the service requestor and member 14c may be designated as the service provider. Particular responsibilities and functions of the initiator 14a, the requestor 14b, and the service provider 14c are discussed in detail below. Suffice it to know that the functions described are applicable to any one of the members 14 of the group 12.

The system 10 is ideally implemented when each member 14 has access to a computer that can transmit electronic mail, voice-mail, or a communication equivalent. Moreover, if each member has a computer that is connected to the world-wide web or other similarly configured computer network, a host/server 16 may be employed to facilitate administration of the system 10. Use of the host/server 16 facilitates communication between the members and also allows for posting of service-related information appropriate for the group 12. If it is desired by the group to not use the host 16, the initiator 14a will need to maintain the appropriate electronic communication links to facilitate operation of the system 10. Regardless of whether the group administrator functions are performed by the host 16 or the computer controlled by the initiator 14a, the computer-based group administrator maintains the necessary hardware, software, and memory resources to ensure the smooth and efficient operation of the system 10.

Although the system 10, as presented herein, is specifically presented for the exchange of child care services, it will be appreciated that other types of services could be exchanged. For example, members of a neighborhood group could exchange services for lawn care, household chores, painting, and the like. The services could be exchanged between members for points established for the number of hours worked and for the type of service performed. The system 10 could also be used to exchange the use of goods such as tools and the like. Moreover, the concept of the present invention is applicable to time-share property, the exchange of vacation time between employees in a company, or for any activity or item in which it is agreed upon by group members that money is not to be exchanged for the service or good. Goods may be tools, videos, records, CDs, books, and other commodity which is only temporarily used and can be returned in relatively good condition to the provider.

Figure 2:
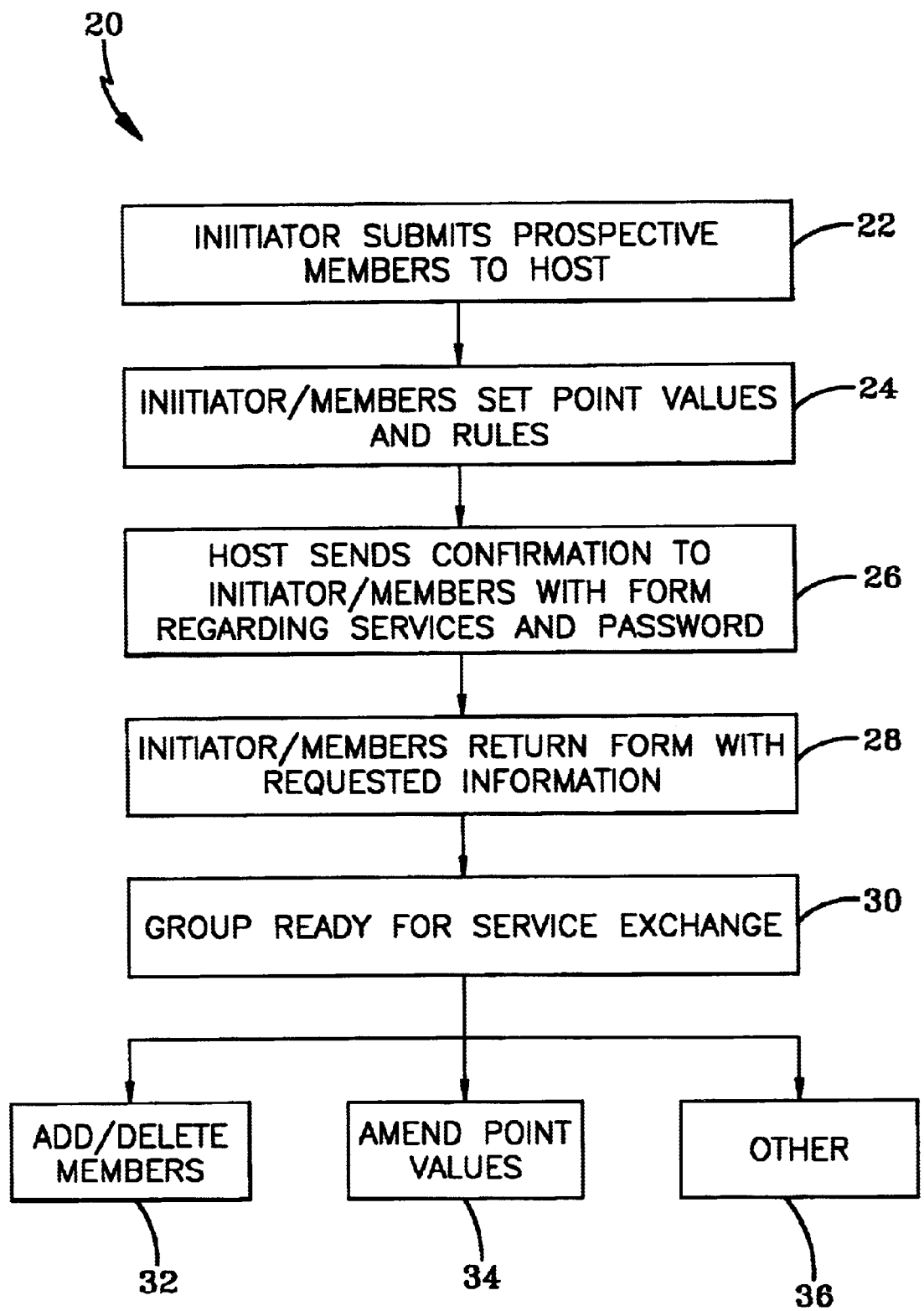
FIG. 2 is a flow chart showing the set-up of a computer-based service cooperative system according to the present invention.

Referring now to FIG. 2, a set-up flow chart is designated generally by the numeral 20. Generally, the set-up procedures are required to establish the ground rules for operation of the particular group 12. It will be appreciated that variations are allowable such that a different group, such as the group 12b, can have different ground rules than the group 12a. In the preferred embodiment, the host 16 maintains a web site explaining the service exchange system, how it is used, the procedures, and how safety concerns are dealt with. Also, privacy matters with the use of passwords between members of the group are explained. Ideally, the administrator 14a or the host 16 provides a template for ground rules to be used and establishing points for services rendered and the like. Although these items can be adapted as needed, the efficient and smooth-running operation of the system cooperative is best implemented by using the suggested guidelines. It is envisioned that the preferred mode of communication will be electronic mail. It will be appreciated that a computer could automatically send voice recorded or computer-generated voice messages between members. Moreover, the members could utilize personal digital assistants and the like to interact with one another according to the teachings of the system 10.

At step 22, the initiator 14a submits a list of prospective members to the host 16 for consideration. The initiator 14a will have tentatively contacted these prospective members and advise them that they are to be submitted to the host 16 for formation of a group 12. At step 24, the initiator, in conjunction with the other members 14, selects an identifying group name, and sets point values for the services to be rendered. For example, a sample point value system may consist of providing two points per child, per hour of service; one point per child, per meal provided to each child; and one point per child, per hour for overnight care. Points may also be designated if the services are to be rendered in the requestor's home and the like. In the context of household chores, the services per hour for mowing could be set at five points per hour, while the services for painting may be four points per hour. Point values may also be provided in partial hour increments.

At step 26, the host 16 or the initiator 14a that runs the system software communicates confirmation to the perspective members with the point value system, the ground rules, and an initial password derived randomly or from the group name and the member's e-mail address. The password can be changed at a later time by each member 14. Although not required for operation of the system 10, it is believed that the use of passwords will ensure the privacy of particular groups so that unwanted individuals cannot access information related to the group or information about the member's children. When the confirmation information is sent out to all members, each member must confirm that the group information submitted is correct. Along with the confirmation sent by the host, an information form is sent. Accordingly, at step 28, each member 14 fills out the form which includes pertinent information, such as an address; a phone number; directions to the member's house; and general information regarding the children, such as their ages, and any special needs, likes, dislikes, bedtimes, etc. Also provided on the information form should be emergency contact information and any other useful information required by the service provider.

Once each member returns the form to the host 16 or the administrator 14a, the group 12 is ready to exchange services between themselves as designated at step 30. It will be appreciated that this set-up operation routine will allow for amendment. For example, at step 32, members may be added or deleted. At step 34, point values and service rules may be amended. Step 36 allows for other miscellaneous changes to be made. Ideally, members will be able to opt out unilaterally. Adding new members or amending point values or other rules will likely be controlled by the initiator 14a. The addition of members may be handled such that each new member must be confirmed by all the current members and the like.

Figure 3:
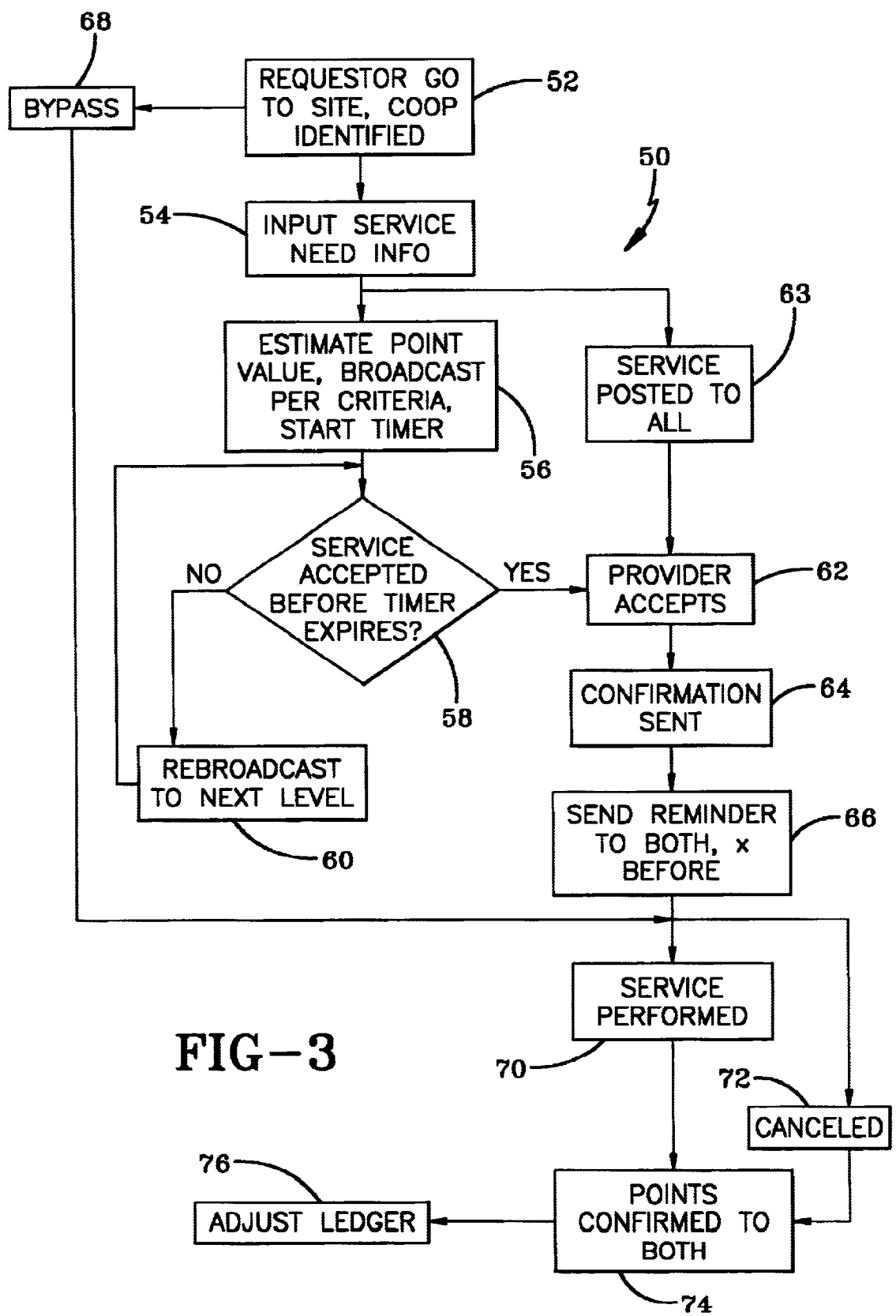
FIG. 3 is a flow chart showing the operational steps carried out by the computer-based group administrator for implementing the service cooperative system according to the present invention.

Referring now to FIG. 3, a flow chart, designated generally by the numeral 50, presents the operational procedures for the service cooperative system 10. At step 52, a member 14b, designated as the requester, goes to the host/server 16, which may maintain a web site with general child care information and which may control further use of the system 10. At the web site, the requestor 14b submits a service request. In the event that the system 10 is not implemented on a host web site, the system may be implemented on a dedicated server not accessible by non-group members or may simply be implemented on a linkable computer with a form for filling out the requested information that is first sent to an administrator member 14a for subsequent distribution to other members 14c. In any event, in the preferred embodiment, the web site will be used by the requestor 14b to first identify their group and access the system. At step 54, the requestor member 14b fills out a request form which is exemplified in FIG. 4 and designated generally the numeral 90. The request form 90 may have designated fields that automatically input the e-mail address or communication link and other information associated with the requestor. The requester 14b then fills in the service date, an estimated start time for the service, and an estimated finish time. The computer program that is maintaining the system may automatically calculate the number of hours in half-hour increments, wherein the time will always be rounded to the nearest half-hour if so designated by the group. The requestor 14b also submits the number of children for which child care is required; the number of meals that will be needed; and whether there is a preference as to where the service is to occur, such as in the requestor's house or the provider's house, or whether that service can be provided at either location.

At step 56, an estimated point value is calculated by the system and then broadcast to other members according to a predetermined criteria. The system 10 may dynamically calculate the estimated point values so that the requestor can see the estimated point value for the service prior to submission. Additionally, at step 56, a timer is started, the benefit of which will become evident as the description proceeds. In regard to the predetermined criteria, the host 16 or initiator 14a maintains a ledger for all members of the group. To start, each member is assigned zero points. When a member 14c provides a service, they receive a credit to their point account according to the number of points earned, while the member 14b requesting the service receives a debit to their point account for the same number of points. It will be appreciated that if a member exceeds a predetermined number of points, as determined at step 24, they may no longer be allowed to request any further services until their point value is brought down to an acceptable level. For example, the group 12a may decide to limit the number of negative points to 100. In any event, at step 56, depending upon the criteria established by the group 12a, the members with the highest negative number of points are advised of the request for services first. Accordingly, the service request is first sent out to those individuals with the highest number of negative points, that is, whoever is most in arrears. The group can establish whether the service request should be sent to one, two, or any number of high negative point total members in the hierarchical group. Once this service is broadcast to those selected members, the timer is initiated. The duration of the timer may be set at step 24 and can range from one minute to one day or longer. In the event the timer expires before anyone accepts the service request, the host or initiator computer, at step 60, re-broadcasts the request to the members with the next lower level negative point numbers. Re-broadcasts can be sent out in hierarchical groups or on a piecemeal basis. This process is repeated until one member 14c accepts the service at step 62 or the request has been distributed to all members of the group, excluding the requestor.

At step 63, it will be appreciated that the person or member requesting the service may request that the service be posted to all members immediately. This accounts for the situation where the service event to be requested is within a very short period of time and will not allow all members to become aware of the service request in a timely manner. This would typically be used in cases of emergencies, where a service is required within forty-eight hours and the like. If desired, a service provided utilizing this emergency feature may add additional points to the total service request.

At step 64, a confirmation communication is sent to both the requestor 14b and the provider 14c by the system that the service will be performed by who and when. This allows the requestor and provider to contact one another to set up specific arrangements. At step 66, the host 16 or initiator 14a may send a reminder to both members 14b and 14c at a predetermined time before the actual service event. It will also be noted that at step 66, when the reminder or confirmation is sent to the service provider, that pertinent information regarding the requestor's family can be provided, such as emergency numbers and the like, so that it is readily available during the service event. It will also be appreciated that the reminder 66 may include information such as where the service requestor will be while away.

It will also be appreciated that the system 10 may provide a bypass step 68, wherein the requestor may separately contact a service provider within the group and together they make service event arrangements separate from the use of the main flow chart steps. This way, the ledger can be adjusted on completion of a service event when the service event request form is not used.

At step 70, the service is performed. A provision may also be provided, at step 72, in the event that the service request is cancelled by either one of the parties. The ground rules may require that a minimal number of points be exchanged for a cancellation. At step 74, at completion of the service, a confirmation request may be sent out by the host 16 or initiator 14a at a predetermined period of time to confirm the point totals. If both parties submit point totals that are inaccurate or do not match with one another, the host can re-submit a confirmation request that this discrepancy be addressed and that the point values be confirmed by both parties until each agree to what the values are. Once this step is completed, the host 16 or initiator 14a adjusts the ledger 76 so that the service provider is credited with the proper number of points and the service requestor is debited the proper number of points. At this time, the host 16 may then send out updated account values for each member of the group and also a ranking so that all members may be aware if their point totals are becoming increasingly negative and that the likelihood of their being contacted to perform a sit in the near future is increased.

Based upon the foregoing, it will be appreciated that the system 10 and related processes, implemented in a computer readable medium, provide numerous advantages over existing cooperative systems. Primarily, the system 10 provides for a ledger that is accurately maintained for the benefit of all members. Additionally, the system 10 significantly reduces the administrative duties of members of the group. Moreover, the system 10 allows for the services to be efficiently requested and booked in a reliable manner. Moreover, this system fairly distributes the service request to those members of the group that need to reduce their negative point totals. Yet another advantage of the present system is that if the service is not booked within a predetermined period of time, that service requestor can begin to look elsewhere for appropriate service.

Thus, it can be seen that the objects of the invention have been obtained by the system and methodology presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A method for exchanging services between members in a group utilizing a network, comprising:

establishing at least two groups, each said group having at least two members, each member having access to a communications device;

determining a point value system for exchanging services between members within each said group;

linking a host computer to each said member's communications devices, said host computer maintaining each said group's point value system;

determining which members of each said group have the highest negative point account by said host computer;

requesting a service by one of said members in one of said groups via said communications device from at least one of the other members in said same group;

sending said service request to said member of said group with the highest number of negative points first;

starting a timer, wherein if said member in said same group with the highest number of negative points does not respond before said timer elapses, said service request is sent to said member in said same group with the next highest number of negative points;

accepting via said computer communications device and performing said service request by one of the other members in said same group; and automatically adjusting a point account maintained on said host computer for the member of said group performing the service and the member of said group requesting the service according to said point value system upon completion of the service.

2. The method according to claim 1, further comprising:

repeating said timer starting step until one of said members in said same group accepts said service request or all of the members in said same group, except the service requester, have been notified of the service event.

3. The method according to claim 1, further comprising:

coordinating said service event requests between members in said group and adjusting said member's point accounts from said host computer.

4. The method according to claim 1, further comprising:

sending a reminder to the members requesting and performing the service some predetermined time prior to a scheduled service event.

5. A method for exchanging services between members utilizing a network, comprising:

establishing a group of members, each member having access to a communications device;

determining a point value system for exchanging services between members, each said member having a point account, said point value system and said point accounts maintained on one of said member's communications device;

determining which members of the group have the highest negative point account;

requesting a service by one of said members via said communications device from said member with the highest number of negative points first;

starting a timer, wherein if said member with the highest number of negative points does not respond before said timer elapses, said service request is sent to said member with the next highest number of negative points;

accepting via said communications device and performing said service request by one of the other members; and automatically adjusting said point accounts maintained on one of said member's communications device for the member performing the service and the member requesting the service according to said point value system upon completion of the service.

6. The method according to claim 5, further comprising:

repeating said timer starting step until one of said members accepts said service request or all of the members, except the service requester, have been notified of the service event.

7. The method according to claim 6, further comprising:

linking a host computer to said member's communications devices, said host computer maintaining said point value system and said point accounts; and coordinating said service event requests between members and adjusting said member's point accounts from said host computer.

8. A method for exchanging services between members utilizing a network, comprising:

establishing a group of members, each member having access to a communications device;

determining a point value system for exchanging services between members, each said member having a point account, said point value system maintained on one of said member's communications device;

ranking the members of the group according to their point account values, wherein the member with the highest number of negative points is ranked first and the member with the least number of negative points is ranked last, and wherein said member requesting said service is excluded from said ranking;

segmenting said ranking into hierarchical groups of said members;

requesting a service by one of said members via said communications device from a first segmented group with the highest ranking first;

starting a timer, wherein if none of the members in said first segmented group accepts said service before said timer elapses, said service request is sent to a next highest ranked segmented group;

accepting via said communications device and performing said service request by one of the other members; and automatically adjusting a point account maintained on one of said member's communications device for the member performing the service and the member requesting the service according to said point value system upon completion of the service.

9. The method according to claim 8, further comprising:

repeating said timer starting step until one of said members accepts said service request or all of the members have been notified of the service event.

10. The method according to claim 9, further comprising:

linking a host computer to said member's communications devices, said host computer maintaining said point value system and said point accounts; and coordinating said service event requests between members and adjusting said member's point accounts from said host computer.

* * * * *